Patented Oct. 16, 1945

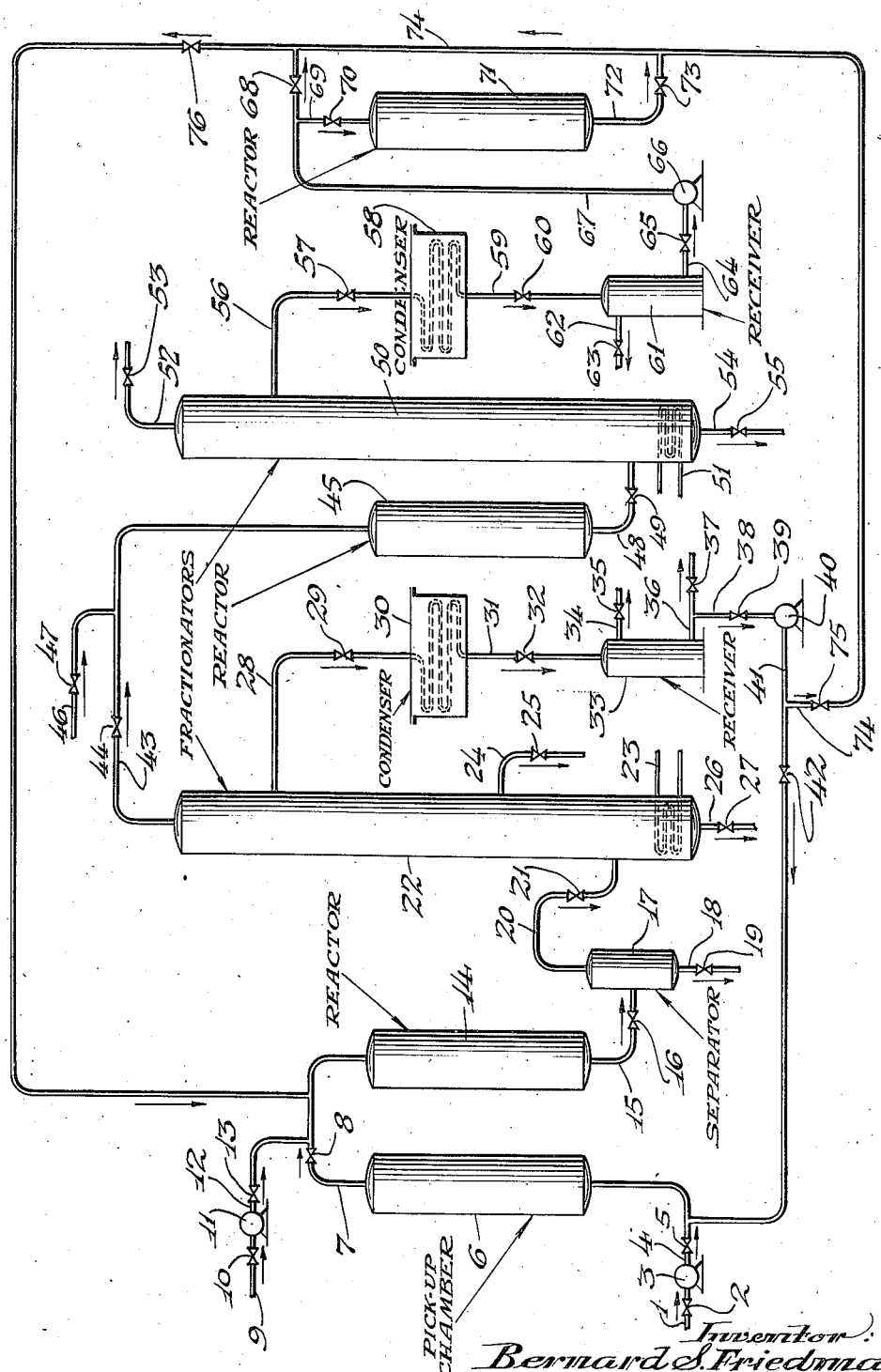

2,386,944

UNITED STATES PATENT OFFICE 2,386,944

METHOD FOR RECOVERING HYDROGEN HALIDE

Bernard S. Friedman, Chicago, Ill., assignor to Universal Oil Products Company, Chicago, Ill., a corporation of Delaware Application May 9, 1942, Serial No. 442,357

6 Claims. (Cl. 260—683.4).

This invention relates to a method for recovering relatively dry hydrogen halides from gas mixtures containing hydrogen halides and more particularly is concerned with the method of recovering and returning hydrogen halides to hydrocarbon conversion processes in which relatively dry hydrogen halides are employed as catalyst activators.

In catalytic processes such as alkylation of hydrocarbons in the presence of an aluminum halide catalyst, it is generally necessary to add a relatively small amount of hydrogen halide to activate the aluminum halide catalyst. The hydrogen halide is generally not consumed in the process but is carried out of the reaction zone with the conversion products. The amount of hydrogen halide that is added is usually from about 1 to about 10 mol per cent of the total hydrocarbons charged to the process, and in order to reduce the operating cost, it is desirable to recover the hydrogen halide from the conversion products so that it may be recycled. Thus the exit gases from such a process in which isoparaffins are alkylated with olefins contain ethane and/or propane as well as a hydrogen halide such as hydrogen chloride. A hydrogen halide such as hydrogen chloride or hydrogen bromide is easily separated by fractionation from hydrocarbons heavier than propane, but it is not separated easily from ethane or propane. If ethane and propane are not separated from the hydrogen chloride that is recycled, an undesirable amount of these hydrocarbons will gradually build up within the system. The present invention makes possible the recovery and recycling to further use of hydrogen chloride present in the exit gases from hydrocarbon conversion processes in which it is employed as a catalyst activator.

In one specific embodiment the present invention comprises a process for recovering relatively dry hydrogen halide from a mixture of hydrogen halide and hydrocarbon gases which comprises contacting the mixture with an olefin under hydrohalogenating conditions to form a product containing an alkyl halide, separating said alkyl halide from hydrocarbon gases, decomposing substantially all of said alkyl halide to liberate therefrom hydrogen halide, and separating the liberated hydrogen halide from the other decomposition products of said alkyl halide.

In the process of the present invention a hydrogen halide such as hydrogen chloride or hydrogen bromide present in the exit gases of a hydrocarbon conversion process, is recovered by contacting said exit gases with an olefin under hydrohalogenating conditions to form a mixture containing an alkyl halide which is readily separable by distillation from the paraffin hydrocarbons present in the exit gas. The alkyl halide so obtained may in some cases be recycled to the hydrocarbon conversion or alkylation zone but in other cases it is sometimes desirable to decompose said alkyl halide either thermally or catalytically to liberate therefrom the hydrogen halide which is then recycled to the reaction zone, such as an alkylation zone. Decomposition of an alkyl halide to liberate hydrogen halide therefrom generally results in the simultaneous formation of an olefin which can be utilized in an alkylation reaction without separation of hydrogen halide therefrom.

One hydrocarbon conversion process which may employ this method of recovering hydrogen halide is, by way of illustration, the alkylation of isobutane with ethylene, propylene, a higher olefin, or mixtures thereof, in the presence of an aluminum chloride catalyst and hydrogen chloride. Usually the olefin-containing mixture charged will contain some ethane and propane as well as ethylene and propylene. These saturated hydrocarbons therefore appear in the exit gases along with the hydrogen chloride which is introduced with the charge to activate the catalyst. In order to favor alkylation and to inhibit certain undesirable side reactions including polymerization, it is necessary to have present a substantial molar excess of isobutane to olefins throughout the entire reaction. The products withdrawn from the alkylation zone are fractionated into a substantially saturated gasoline, unconverted isobutane, and a gas mixture containing hydrogen chloride. Said gas mixture is commingled with an olefin as ethylene or a higher olefin and contacted with a hydrohalogenating catalyst such as aluminum chloride, aluminum bromide, ferric chloride, ferric bromide, bismuth chloride, boron fluoride, etc., under hydrohalogenating conditions of temperature and pressure to form an alkyl halide which is readily separable by fractional distillation from the lower boiling hydrocarbons such as ethane and propane. The alkyl halide is cooled and removed as a liquid which is either charged back to the alkylation reactor or decomposed to olefin and hydrogen chloride by passage over a catalyst known to promote dehydrohalogenation such as barium chloride on pumice or on alumina maintained at a temperature of from about 350° to about 550° C.

The accompanying drawing illustrates diagrammatically an aluminum chloride alkylation process employing the method for recovering and recycling hydrogen halide according to the process of this invention. For purposes of illustration the description of the drawing refers to the alkylation of isobutane by ethylene present in an ethane-ethylene fraction.

Referring to the drawing, an isobutane fraction at a desired reaction temperature is introduced through line 1 and valve 2 to pump 3 which discharges through line 4 and valve 5 to catalyst pick-up chamber 6 containing granular aluminum chloride. In line 4 the charged isobutane is commingled with recycled isobutane directed thereto through line 41 as hereinafter set forth.

In catalyst pick-up chamber 6 the isobutane charged thereto dissolves a portion of the aluminum chloride catalyst and the resultant solution is directed from chamber 6 through line 7 and valve 8. A mixture of an ethane-ethylene fraction and enough hydrogen chloride to make up for losses elsewhere in the system is introduced through line 9 and valve 10 to pump or compressor 11 which discharges through line 12, valve 13 and line 7 to reactor 14 containing a granular solid packing material such as alumina, silica, etc. which does not react adversely with aluminum chloride and upon which the incoming aluminum chloride catalyst will be deposited. The molar ratio of isobutane to ethylene in the stream entering packed reactor 14 is approximately 7:1 although this ratio may vary between about 2:1 and about 20:1.

The products from packed reactor 14 pass through line 15 and valve 16 to separator 17 wherein entrained aluminum chloride-hydrocarbon complex or sludge is separated and withdrawn through line 18 and valve 19. The reaction products then pass through line 20 and valve 21 to fractionator 22 of conventional design and provided with reboiler coil 23. The alkylation product of gasoline boiling range is withdrawn through line 24 and valve 25 to cooling and storage, not shown, while higher boiling products are discharged through line 26 and valve 27.

Isobutane is withdrawn as a side-cut from fractionator 22 through line 28 and valve 29 to condenser 30 from which the liquefied hydrocarbon passes through rundown line 31 and valve 32 to receiver 33 provided with gas release line 34 containing valve 35. The liquefied isobutane may be withdrawn from receiver 33 through line 36 and valve 37. At least a portion of the isobutane being discharged through line 36 is directed therefrom through line 38 and valve 39 to pump 40 which discharges through line 41 and valve 42 into line 4, already mentioned.

From the top of fractionator 22 a mixture comprising essentially ethane and hydrogen chloride is directed through line 43 and valve 44 to reactor 45 containing a hydrohalogenating catalyst such as aluminum chloride, ferric chloride, bismuth chloride, etc., as such or supported by a carrier such as alumina and maintained at a hydrohalogenating temperature which is generally not in excess of about 250° C. An olefin or olefin-containing fraction such as an ethane-ethylene mixture is introduced by a pump or other suitable means, not shown, to line 46 containing valve 47 and thence to line 43, already mentioned. The ethane-ethylene mixture so introduced should contain sufficient ethylene to react with substantially all of the hydrogen chloride and to convert it into ethyl chloride which together with unconverted gases is directed from reactor 45 through line 48 and valve 49 to fractionator 50 of conventional design provided with reboiler coil 51. Ethane and also propane, if the latter is present, are discharged from the top of fractionator 50 through line 52 and valve 53, while materials boiling higher than the desired alkyl halide are withdrawn through line 54 and valve 55. The alkyl halide such as ethyl chloride which is separated from lower boiling and higher boiling products in fractionator 50 is discharged as vapor through line 56 and valve 57 to condenser 58 from which the liquefied alkyl halide is directed through run-down line 59 and valve 60 to receiver 61 equipped with conventional gas release line 62 containing valve 63. The liquefied alkyl halide is withdrawn from receiver 61 through line 64 and valve 65 by pump 66 which discharges through line 67 containing valve 68. By closing valve 70 in branch line 69 the alkyl halide may be directed from line 67 through valve 68 and recycle line 74 containing valve 76 to line 7, already mentioned, through which the charged reactants and catalyst enter reactor 14. However, it is sometimes preferable to keep valve 68 closed and to direct the alkyl halide from line 67 through line 69 and valve 70 into dehydrohalogenation reactor 71 containing a catalyst such as barium chloride on pumice or alumina maintained at a temperature between about 350° and about 550° C. in order to substantially decompose said alkyl halide into hydrogen halide and olefin. The dehydrohalogenation products containing said hydrogen halide and olefin are directed from reactor 71 through line 72 and valve 73 to recycle line 74 containing valves 75 and 76. In order to assist in the recycling of either alkyl halide or decomposition products of said alkyl halide, it is generally desirable to direct a portion of the recovered isobutane from line 41 through line 74 wherein said isobutane is commingled with the alkyl chloride or hydrogen chloride-containing mixture and recycled to line 7, already mentioned.

The process of this invention is also utilizable for recovering hydrogen bromide. Sometimes olefins of higher molecular weight than ethylene may be utilized more easily for producing alkyl halides which may be separated readily by fractional distillation from the substantially saturated hydrocarbons present in gases such as those released from a hydrocarbon conversion process.

The method of this invention is also applicable to the separation of olefinic hydrocarbons from saturated hydrocarbons. Thus an olefin-paraffin mixture is reacted with hydrogen chloride under suitable conditions to convert the olefins into alkyl chlorides which are readily separable by distillation from the lower boiling paraffinic hydrocarbons present in the paraffin-olefin mixture undergoing separation. An alkyl chloride so formed from an olefin and separated from admixed paraffins is readily convertible into a mixture of olefins and hydrogen chloride by treatment with a dehydrohalogenating catalyst such as barium chloride on alumina or on pumice. Thermal treatment is also utilizable in decomposing an alkyl halide to recover therefrom a hydrogen halide.

The following example is introduced to show results obtainable in the operation of the process for recovering and recycling hydrogen chloride in isoparaffin alkylation, although the example is not presented with the intention of unduly limiting the broad scope of the invention.

The effluent gas from a process in which isobutane is alkylated with ethylene in the presence of an aluminum chloride catalyst, after separation of alkylate and excess isobutane, contains 8 mole per cent of hydrogen chloride and 92 per cent of ethane. About 20 mole per cent of an equal molecular mixture of ethylene and ethane is commingled with said hydrogen-chloride-ethane mixture and the resultant material is contacted with aluminum chloride catalyst at a temperature of about 130° C. whereby ethyl chloride is formed from substantially all of the hydrogen chloride contained in said mixture. After cooling, ethyl chloride is in the form of a liquid which is readily fractionated from the ethane, the latter being discharged from the process. The ethyl chloride is then commingled with a portion of the recovered isobutane and recycled to the alkylation stage of the process.

In another mode of operation the ethyl chloride obtained after cooling the hydrohalogenation products is passed through a reactor containing a composite of barium chloride and alumina maintained at 400° C. whereby the ethyl chloride undergoes substantially complete conversion into a mixture of hydrogen chloride and ethylene, said mixture being suitably recycled to the alkylation stage of the process.

The above example indicates a specific process in which one embodiment of my invention may be employed. However, it is not intended that the broad scope of the invention described in the specification should be limited by the example given.

I claim as my invention:

1. In the alkylation of an isoparaffin with an olefin in the presence of an aluminum halide and a hydrogen halide of the middle halogens, wherein there is separated from the conversion products a gaseous mixture containing hydrogen halide and a paraffin of less than 4 carbon atoms to the molecule, the method which comprises adding an olefin to said mixture and reacting the same with the hydrogen halide content of the mixture to form an alkyl halide, separating the alkyl halide thus formed from said paraffin of less than 4 carbon atoms and supplying the same to the alkylating step.

2. In the alkylation of isobutane with ethylene wherein the isobutane and an ethane-ethylene fraction are subjected to the action of an aluminum halide and a hydrogen halide of the middle halogens, and wherein there is separated from the conversion products a gaseous mixture containing hydrogen halide and ethane, the method which comprises adding ethylene to said mixture and reacting the same with the hydrogen halide content of the mixture to form an ethyl halide, separating the ethyl halide thus formed from the ethane content of said mixture and supplying the same to the alkylating step.

3. The process defined in claim 1 further characterized in that said hydrogen halide comprises hydrogen chloride and said aluminum halide comprises aluminum chloride.

4. The process defined in claim 1 further characterized in that said hydrogen halide comprises hydrogen bromide and said aluminum halide comprises aluminum bromide.

5. The process defined in claim 2 further characterized in that said hydrogen halide comprises hydrogen chloride and said aluminum halide comprises aluminum chloride.

6. The process defined in claim 2 further characterized in that said hydrogen halide comprises hydrogen bromide and said aluminum halide comprises aluminum bromide.

BERNARD S. FRIEDMAN.